United States Patent [19]

Ramsden

[11] 4,073,046
[45] Feb. 14, 1978

[54] SHOCK ABSORBER INSTALLATION TOOL

[76] Inventor: Frederick G. Ramsden, 157 Division St., East Greenwich, R.I. 02886

[21] Appl. No.: 626,540

[22] Filed: Oct. 28, 1975

[51] Int. Cl.² .......................... B25B 27/14; B23P 7/00
[52] U.S. Cl. ...................................... 29/401 R; 29/271
[58] Field of Search ................ 29/401, 402, 283, 271, 29/272

[56] References Cited

U.S. PATENT DOCUMENTS

| 463,048 | 11/1891 | Hanlen | 29/283 |
| 1,747,790 | 2/1930 | Pearson | 29/271 UX |
| 1,822,649 | 9/1931 | Evans | 29/271 |
| 2,570,618 | 10/1951 | Werner | 29/271 X |
| 2,826,807 | 3/1958 | Harris | 29/271 |
| 2,917,954 | 12/1959 | Capelle | 29/271 X UX |
| 3,000,086 | 9/1961 | Davis | 29/271 |

Primary Examiner—C.W. Lanham
Assistant Examiner—V. Rising

[57] ABSTRACT

A shock absorber installation tool is provided for installing shock absorbers together with a method for installing shock absorbers in automobiles and other vehicles. The shock absorber installation tool comprises an elongated member having at one end means for engaging the upper shaft of a shock absorber and at the other end means for guiding and positioning the upper shaft of the shock absorber in the shock absorber bearing support to provide a relatively easy and efficient method for installing shock absorbers. The tool for installing shock absorbers together with the method for installing shock absorbers allows shock absorbers to be removed and installed in MacPherson and MacPherson type strut assemblies with a minimum of mechanical operations and tools which have heretofore been required for the replacement and installation of shock absorbers.

10 Claims, 8 Drawing Figures

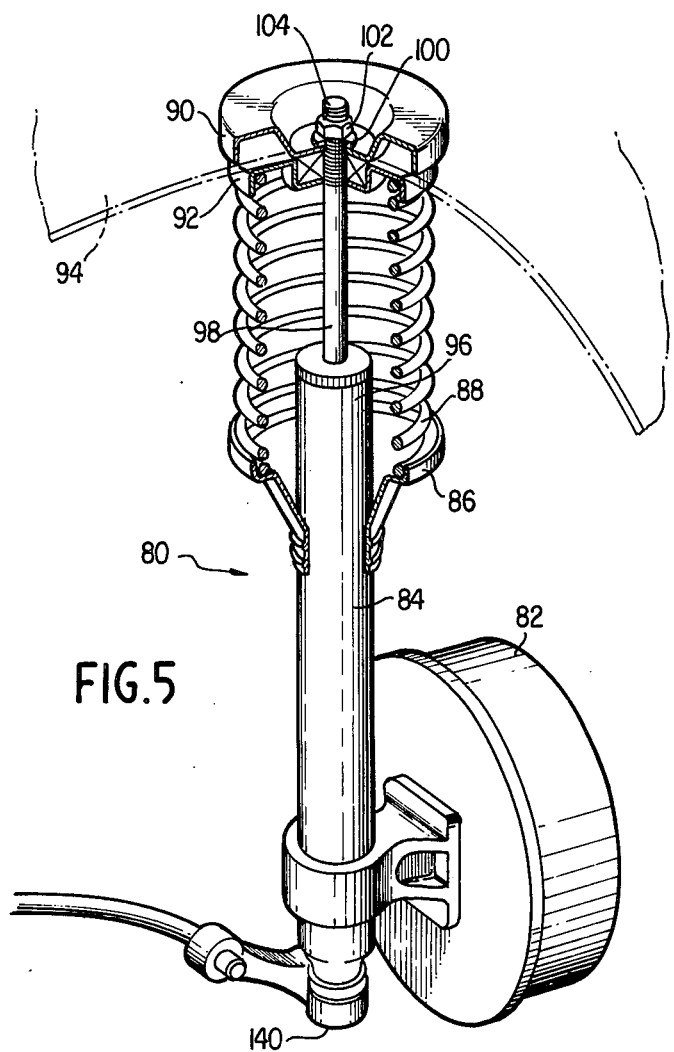
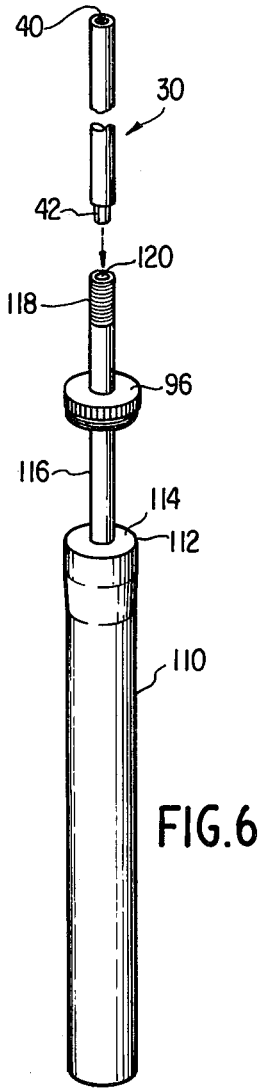
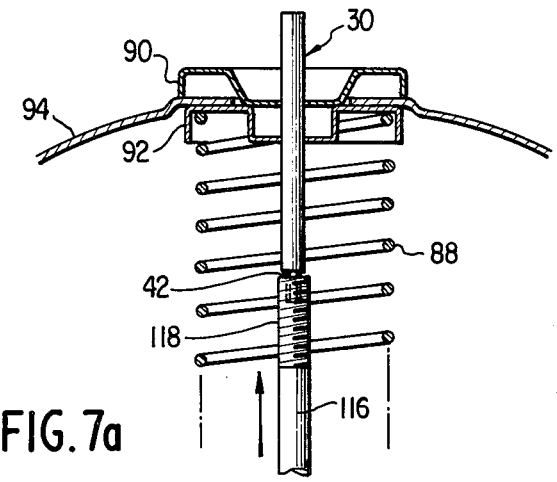
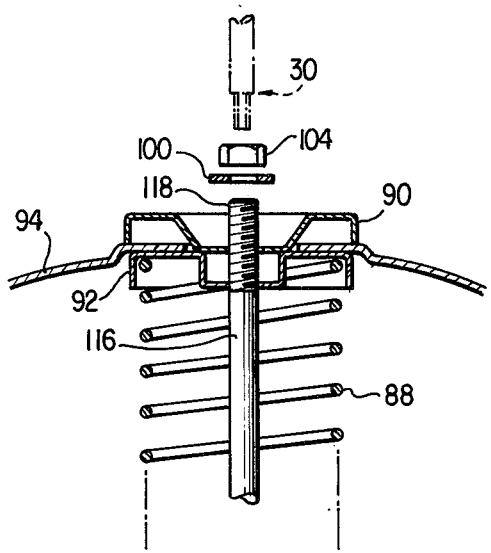

SHOCK ABSORBER INSTALLATION TOOL

BACKGROUND OF THE INVENTION

1. Field of the Invention

This invention relates to shock absorber installation tools and more particularly to a shock absorber installation tool and method for installing shock absorbers in vehicles employing MacPherson and MacPherson type strut assemblies.

2. Description of the Prior Art

Vehicles generally employ shock absorbers to stabilize their riding characteristics and protect passengers by providing effective control and preventing structural damage to the vehicle. Shock absorbers accomplish their function by coacting with the suspension system to dampen the effects of stresses and forces on the wheels of the vehicle. In dampening such forces the shock absorbers generally wear out and it is therefore common practice to replace the shock absorbers of the vehicles many times over the vehicle's useful life. Heretofore the replacement of shock absorbers in MacPherson strut assemblies has required numerous mechanical operations and consequently a considerable amount of time to remove and install new shock absorbers. In vehicles employing a MacPherson and MacPherson type strut assembly the shock absorber projects through the inside of the coil spring with the upper shock absorber shaft additionally projecting through and being attached to a portion of the vehicle body. Replacement of shock absorbers in such strut assemblies have required considerable time and effort in that shock absorbers in such vehicles have heretofore been removed by a complete removal of the MacPherson type strut assembly from the vehicle which normally includes the removal of brake hoses, steering arm and strut bolts to allow the assembly to be taken to a workbench. At the workbench a vise and a spring compressor are employed before the removal of the shock absorber nut. At this point the spring may be removed in a decompressed or a compressed state depending upon the prior art system employed. With either system the shock absorber is then removed from the shock absorber receptacle and a new shock absorber installed. Prior to the reinstallation of the coil spring the upper shaft of the shock absorber should be maintained in an extended position and the spring is reinstalled if compressed or recompressed depending upon the prior art system employed, as previously discussed. The shock absorber nut is reinstalled, the spring compression mechanism is removed, the unit taken from the workbench and subsequently reinstalled on the vehicle. The method of the prior art then requires the reconnection of the aforementioned systems and a necessary realignment and servicing of the brake system resulting from the removal of the system from the vehicle in addition to other mechanical operations.

MacPherson strut assemblies, as a consequence of their configuration have provided an efficient spacial disposition of the elements of the wheel suspension system which has required a number of mechanical operations and tools to install or replace shock absorbers due to the inaccessibility of the shock absorber in the strut assembly. This inaccessibility of the shock absorber in such strut assemblies has resulted in the expenditure of considerable time and labor of the mechanic in removing and replacing this type of shock absorber which has resulted in considerable costs for the replacement of shock absorbers.

SUMMARY OF THE INVENTION

The disadvantages and limitations of the prior art tools and methods for installing and replacing shock absorbers are obviated by the present invention which provides a shock absorber installation tool together with a method for installing and replacing shock absorbers which reduces the time and number of tools and mechanical operations heretofore required to replace shock absorbers.

In accordance with the present invention a shock absorber installation tool is provided having at one end a means for engaging the upper shaft of a shock absorber and a means at the other end for guiding the upper shaft of the shock absorber through the coil spring and into the shock absorber bearing support which may be attached to or be part of the frame of the vehicle. The precise means of the tool for engaging the upper shaft of the shock absorber is dependent upon the configuration of the upper shaft of the shock absorber. Generally the upper shaft of a shock absorber used in MacPherson type strut assemblies is hollow at the end and has a threaded portion surrounding a part of the hollow end. A tool in accordance with the invention may conveniently employ a variety of mechanical engaging techniques to engage the upper shock absorber shaft which may be an inside engaging mechanism for engaging the hollow portion of the shock absorber's upper shaft. An outside engaging mechanism for engaging an outside threaded portion of the upper shaft may be employed where modifications in the upper shaft assembly are made such as a stepped threaded portion, as may be dictated by the shock absorber design. Once the upper end of shock absorber shaft is engaged the other end of the tool of the invention is formed to provide a method for guiding and positioning the upper shock absorber shaft in and through a bearing support whereupon the shock absorber nut is subsequently secured.

The shock absorber installation tool of the present invention in one operative form employs an inside engaging mechanism accomplished by an inside friction lock which may be achieved in a variety of different ways. The friction lock may consist of a hexagonal shaped solid bolt of a size sufficient to tightly engage the opening at the top of the upper shock absorber shaft and used to position the shaft in the bearing support. Alternatively the inside friction lock may be achieved through the use of various types of expansion devices so that the engaging mechanism may be inserted in the opening in the upper portion of the shock absorber shaft and then expanded to frictionally engage the upper shock absorber shaft. It is contemplated that the engaging bolt of the inside friction lock will utilize a variety of shapes for engaging the opening in the upper shaft of a shock absorber to provide a friction lock. The bolt of the engaging mechanism may additionally be ribbed, serated or threaded to further increase the frictional contact between the engaging end of the tool and the opening in the top of the upper shaft of the shock absorber.

Tools in accordance with the present invention which frictionally engage the inside opening in the upper shock absorber shaft preferably employ a friction tensioning mechanism for adjusting the amount of force engaged by the tool against the confronting wall of the opening in the upper shaft of the shock absorber. This tensioning device may employ an expandable type prong device bolt which may be expanded within the opening in the top of the upper shaft of the shock absorber to increase the frictional contact between the tool of the present invention and the inside wall of the opening in the upper shaft of the shock absorber. The tensioning mechanism of the present invention may conveniently be actuated by employing a rotatable bar disposed in a hollow center of the tool so that expansion of the expandable bolt may be activated by twisting a portion of the rotatable bar at the handle end of the tool.

The shock absorber installation tool of the present invention may conveniently employ a ribbed handle to provide a grip to assist in the positioning of the upper portion of the shaft of the shock absorber in the bearing support. The tool may additionally be tapered to allow the shock absorber nut to be placed over the elongated portion of the tool and contact the threaded portion of the upper shock absorber shaft without the prior removal of the tool from the upper shock absorber shaft. The tool tapered in accordance with the present invention thereby provides a convenient method for positioning the upper shaft of the shock absorber in the shock absorber bearing support and securing the shaft with the shock absorber nut before the shock absorber installation tool is removed from the opening in the top of the upper shaft of the shock absorber.

The shock absorber installation tool of the invention is particularly compatible with the method of the present invention for installing shock absorbers. The method of installing shock absorbers is conveniently achieved by raising the vehicle and removing the wheels. After the wheels have been removed the stabilizer retaining bolts are removed and compression is placed on the coil spring and the shock absorber nut is removed from the threaded portion of the upper shock absorber shaft. After the shock absorber nut is removed the coil spring is allowed to decompress thereby allowing the wheel assembly suspension unit containing the shock absorber to be removed from the shock absorber bearing support. The entire wheel assembly suspension unit may then conveniently be tilted away from the vehicle and the old shock absorber removed from the shock absorber receptacle. A new shock absorber is installed in the shock absorber receptacle in the manner known to those skilled in the art and the tool of the present invention is employed to engage the upper shaft of the shock absorber and used to guide and position the upper shaft of the shock absorber into the bearing support as the coil spring is compressed. Once the coil spring is sufficiently compressed the upper shaft of the shock absorber is positioned in the bearing support with the tool of the invention so that the shock absorber nut can be placed on the threaded portion of the upper shock absorber shaft and the tool may be removed.

BRIEF DESCRIPTION OF THE DRAWING

The invention will be more fully understood from the following detailed description taken in conjunction with the accompanying drawing in which:

FIG. 5 is a partial cut-away perspective view of a wheel assembly suspension unit;

FIG. 6 is a perspective view of a shock absorber and the novel tool for engaging the upper shaft of a shock absorber;

FIG. 7a is a partially cut-away elevational view of a portion of FIG. 5 and the novel tool in operative form; and FIG. 7b is a partially cut-away view similar to FIG. 7a depicting the installation of a shock absorber and the removal of the novel tool from its operative form.

DETAILED DESCRIPTION OF THE INVENTION:

While the present invention will be described by way of example and for convenience with respect to a shock absorber installation tool having a hexagonal shaped engaging mechanism it will be understood that the invention has a wide range of applicability to shock absorber tools having an engaging mechanism of the other configurations and designs.

Figure 1:
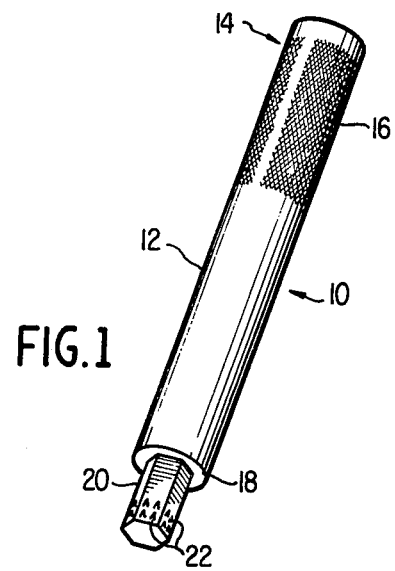
FIG. 1 is a perspective view of a tool constructed according to the invention.

The shock absorber installation tool 10 as shown in FIG. 1 includes an elongated body 12 of a generally circular cross-sectional configuration with a handle 14 disposed thereon. A hand restraining cross-ribbed portion 16 is disposed on the handle 14 to assist in the operation of the tool as will be discussed more fully hereinafter.

At the forward end 18 a forwardly projecting hexagonal shaped bolt 20 is provided for frictionally engaging the upper shaft of a shock absorber. Bolt 20 is formed of a sufficient size to closely mate inside the opening in the top of the upper shaft of the shock absorber. A series of rearwardly facing projections 22 may be disposed on bolt 20 to assist in the frictional engagement of the inside opening in the shock absorber's upper shaft.

Figure 2:
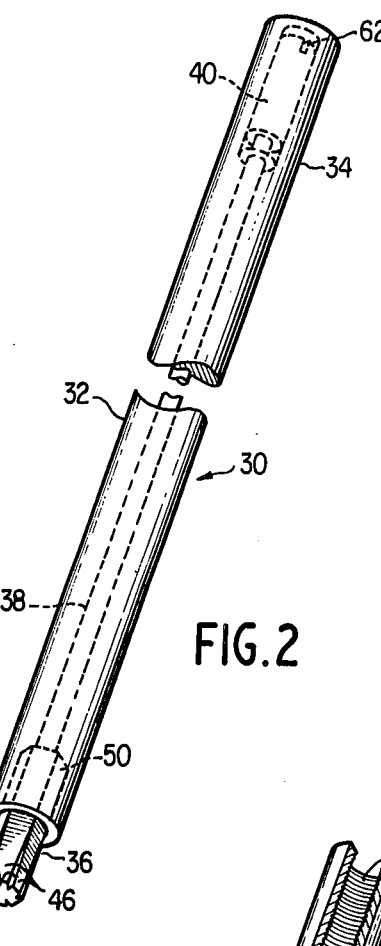
FIG. 2 is a perspective view of an alternative embodiment of the tool constructed according to the invention.

With reference now to FIG. 2 there is shown an alternative embodiment of a tool constructed in accordance with the present invention. In FIG. 2 the shock absorber installation tool 30 includes a generally hollow elongated body 32 of a generally cylindrical cross-sectional configuration with a handle 34 at its rearward end and an adjustable engaging means 36 at its forward end. The adjustable engaging mechanism 36 is actuated by forwardly advancing an actuating rod 38 by means of a screw assembly 40 located in handle 34 of tool 30.

Figure 3:
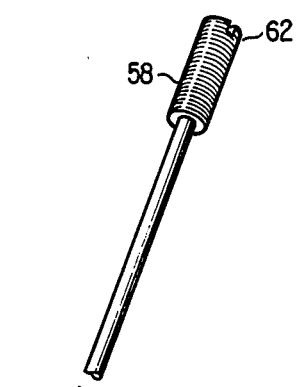
FIG. 3 is a perspective view of the actuating mechanism of FIG. 2.
Figure 4:
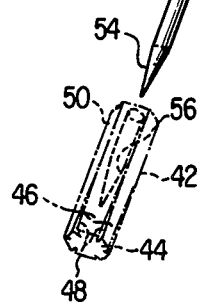
FIG. 4 is a partial cut-away view similar to FIG. 2 depicting the alternative embodiment of the tool without the actuating mechanism.

Referring now to FIGS. 2, 3 and 4 the adjustable engaging mechanism 36 of tool 30 for frictionally engaging an opening in the upper shaft of the shock absorber is accomplished by a laterally expandable hexagonally shaped bolt 42 disposed on the forward end of tool 30. Lateral expansion of bolt 42 is accomplished by forwardly advancing rod 38 down the hollow center 39 of tool 30 by means of a screw assembly 40 located in handle 34. Laterally expandable bolt 42 includes a semi-flexible metal pronged assembly 44 consisting of six laterally expandable prongs 46 having six spaces 48 disposed therebetween. The rearward portion 50 of bolt 42 is constructed as a permanent or semi-permanent part of the tool to seat in cavity 52 in the forward end of the tool 30. Laterally expandable bolt 42 is expanded laterally by forwardly actuating rod 38 which has at its forward end a conical shaped point 54 which forces a confronting conically shaped slot 56 disposed within bolt 42 to laterally expand and frictionally engage inside an opening in the upper shaft assembly of a shock absorber. Forward advancement of actuating rod 38 is provided by a screw assembly 40 which consists of a male threaded portion 58 disposed on actuating rod 38 and a corresponding female threaded portion 60 disposed in the handle 34. In tool 30 actuating rod 38 can be advanced by operating slot 62 with a conventional screwdriver although the tool may be constructed with a hand or wrench actuated cap (not shown) which may be disposed on handle 34.

Referring now to FIG. 5, there is shown a vehicle wheel suspension assembly 80 having a wheel hub 82 a shock absorber receptacle 84 having a cavity therein for receiving a shock absorber and a coil spring lower retaining mount 86 disposed thereon and a coil spring 88, a shock absorber bearing support 90 and an upper coil spring retaining mount 92. Upper coil spring retaining mount 92 is disposed to receive the coil spring 88 and be secured to the body frame through a fender panel 94 secured in various known ways to the body frame. In a MacPherson strut assembly as depicted in FIG. 5, the body of the shock absorber is contained in the cavity of shock receptacle 84 and is secured in the shock cavity and covered by a receptacle closure nut 96 through which the upper shock absorber shaft 98 protrudes. The upper portion of shock absorber shaft 98 passes through coil spring 88, upper coil spring retaining mount 92, through a hole in the body frame or fender 94 and through the shock absorber bearing support 90 and is secured to the body frame or fender 94 by fastening the shaft 98 in bearing support 90. Fastening of shaft 98 in shock absorber bearing support 90 is accomplished by employing a washer 100 and a shock absorber nut 102 which fits over the threaded portion 104 of the upper shock absorber shaft 98.

Referring now to FIG. 6 there is shown a replacement shock absorber and an embodiment of the shock absorber installation tool of the present invention. In FIG. 6 the body 110 of the shock absorber terminates at its top end 112 with a shock absorber top portion 114 which allows the upper shock absorber shaft 116 to be slidingly disposed within the shock absorber body 110. Disposed on upper shock absorber shaft 116 is the shock absorber receptacle closure nut 96 as depicted FIG. 5 which is subsequently used to close shock absorber receptacle 84. The upper portion of shock absorber shaft 116 contains a threaded portion 118 having an opening 120 disposed at the end of threaded portion 118.

In FIG. 6 an operative form of the shock absorber installation tool 30 is depicted which is similar to the shock absorber tool 30 in FIG. 2 and which for convenience has had its corresponding parts numbered similar to tool 30 as depicted in FIG. 2. Tool 30 in FIG. 6 like tool 30 in FIG. 2 includes a screw assembly 40 and a laterally expandable hexagonal shaped bolt 42 for engaging the opening 120 in the upper shaft 116 of shock absorber 110. Once engaged laterally expandable shaped bolt 42 is adjusted to frictionally engage the opening 120 and is utilized as will be discussed more fully hereinafter.

The operational features of the shock absorber tool of the present invention and the method of installing shock absorbers is more fully illustrated in FIG. 7a and FIG. 7b. The utilization of the shock absorber installation tool and the method for installing shock absorbers in accordance with the present invention contemplates first a compression of coil spring 88 (not shown) which may be achieved by raising the vehicle on a lift so that the weight of the wheel assembly 80 (FIG. 5) expands spring 88 by its own weight and by subsequently exerting force on the strut assembly at or near point 140 (FIG. 5) to compress coil spring 88. At this point it is preferable to remove stabilizer bars or any mechanisms that would ultimately prevent a full extension of coil spring 88 out of shock absorber bearing support 90 and upper coil spring retaining mount 92. Shock absorber nut 102 and washer 100 are then removed from the threaded portion of 104 of upper shock shaft 98 and the entire wheel assembly is lowered down through bearing support 90 allowing the assembly to be tilted away from the vehicle. The coil spring is then removed and closure nut 96 is accessible and removed and the old shock absorber removed and a new shock absorber 110 is positioned in shock absorber receptacle 84 as is known by those skilled in the art. At this point the shock absorber installation tool of the present invention may be placed in the upper shock absorber opening 120 (FIG. 6) either before or after the unit is tilted back toward frame 94 for installation. Generally it is preferable to insert tools similar to those depicted in FIG. 1 prior to the tilting of the unit back toward the frame due to the difficulty of otherwise properly engaging opening 120 in shaft 116 which partly results from the tendency of upper shaft 116 to retract into the shock absorber body 110. In using tools similar to those depicted in FIG. 1 it is generally advantageous to tape around shaft 116 near the shock absorber closure nut 96 or provide other temporary means for maintaining the full extension of shaft 116 from shock absorber body 110 during installation. With tools similar to those depicted in FIG. 2 the adjustable bolt 42 may be more readily inserted in opening 120 through the bearing support (FIG. 7a) and subsequently tensioned to frictionally engage opening 120 in upper shock absorber shaft 116 without providing temporary means for maintaining the full extension of shaft 116 as heretofore described.

Referring now to FIG. 7a and 7b there is depicted the tool 30 having engaging bolt 42 engaged in the opening 120 (FIG. 6) of upper shock absorber shaft 116. Tool 30 is used to guide and position upper shock absorber shaft 116 through upper coil spring retaining mount 92, frame 94 and bearing support 90. The operation of tool 30 is assisted by compressing the coil spring 88 by employing an upward force at or near the area around 140 (FIG. 5) to assist the positioning of upper shock absorber shaft 116 and the threaded portion 118 in the bearing support 90. Tool 30 may conveniently be made of such a diameter that washer 100 and shock absorber nut 102 may be placed over the top of tool 30 and secured around threaded portion 118 without the prior removal of the shock absorber installation tool.

The preferred embodiment of the present invention contemplates the use of a shock absorber installation tool similar to that as depicted in FIG. 2 as this embodiment allows the insertion of the adjustable engaging bolt in the upper shock absorber shaft when the shaft is not maintained in an extended position and is within the coil spring 88. Problems with retraction of the upper shock absorber shaft 116 into shock absorber 110 may be reduced when employing a tool similar to FIG. 1 by taping or otherwise maintaining the full extension of upper shock absorber shaft 116 (FIG. 6) as heretofore described during the installation of shock absorbers in accordance with the method of the present invention.

It will be appreciated that the invention can be implemented in a number of different ways by those skilled in the art to suit particular requirements in the installation and replacement of shock absorbers. For example, the size and configuration of the tool of the present invention and the method of engaging the shock absorber may be varied to accommodate various types and models of shock absorbers. It is further appreciated by those skilled in the art that the method of the present invention may be modified and varied to suit particular requirements. It will be understood that these and various other changes and substitutions may be made within the spirit and scope of the invention as defined in the appended claims.

What is claimed is:

1. A tool for installing shock absorbers comprising: an elongated member, said elongated member having at its forward end a non-expandable bolt having disposed thereon a series of rearwardly facing projections said bolt and said rearwardly facing projections being of sufficient size to seat in the inside opening of a shock absorber shaft such that upon retraction said rearwardly facing projections are forced into the metal confronting wall defining the inside opening in the top of a shock absorber's upper shaft, and a handle at the rearward end for guiding said upper shaft of said shock absorber into a shock absorber bearing support.

2. The tool of claim 1 wherein a hand restraining cross-ribbed portion is disposed on said handle to assist in guiding the upper shaft of a shock absorber into a shock absorber bearing support.

3. The tool of claim 1 wherein said series of rearwardly facing projections are ribs disposed on the forward end of said bolt.

4. The tool of claim 3 wherein said non-expandable bolt is hexagonal shaped.

5. A tool for installing shock absorbers comprising:
(a) a hollow elongated member having at one end;
(b) an adjustable member for engaging the upper shaft of a shock absorber said adjustable member comprising a laterally expandable bolt disposed on said hollow elongated member, said bolt having at its forward end a plurality of laterally expandable prongs, said prongs providing maximum lateral expansion at the terminal end of said expandable bolt;
(c) means for expanding said laterally expandable bolt, said means comprising a rod capable of forward and rearward actuation within said hollow elongated member wherein said forward and rearward actuation of said rod within said elongated member is provided by a screw assembly disposed in said elongated member and wherein the forward end of said rod provides bias against the internal sides of said prongs; and
(d) means at the other end of said hollow elongated member for guiding said upper shaft of said shock absorber into a shock absorber bearing support.

6. The tool of claim 5 wherein means for guiding said upper shaft of said shock absorber into a shock absorber bearing support is a handle disposed on said elongated member.

7. The tool of claim 5 wherein said laterally expandable bolt has four prongs.

8. A tool for drawing and positioning workpieces having a limited depth bore comprising:
(a) an elongated member having a forward end and a rearward end, said forward end containing
(b) a laterally expandable bolt, said bolt having at its forward end a plurality of laterally expandable prongs;
(c) said prongs having a frustro-conical inner surface to provide lateral expansion upon actuation by an actuating rod having a forward and rearward travel within said elongated member;
(d) said combination of prongs and actuating rod providing maximum lateral expansion at the terminal end of said expandable bolt;
(e) a screw assembly disposed in said elongated member for actuating said forward and rearward travel of said rod; and
(f) a handle at the rearward end of said elongated member for guiding and positioning a workpiece having a limited depth bore engaged by said laterally expandable bolt.

9. The tool of claim 8 wherein said actuating rod has a conical shaped end for confronting the frustro-conical inner surfaces of said prongs.

10. The tool of claim 8 wherein said prongs have a series of rearwardly facing projections disposed on the outer surface of said prongs.

* * * * *